Figure 1:
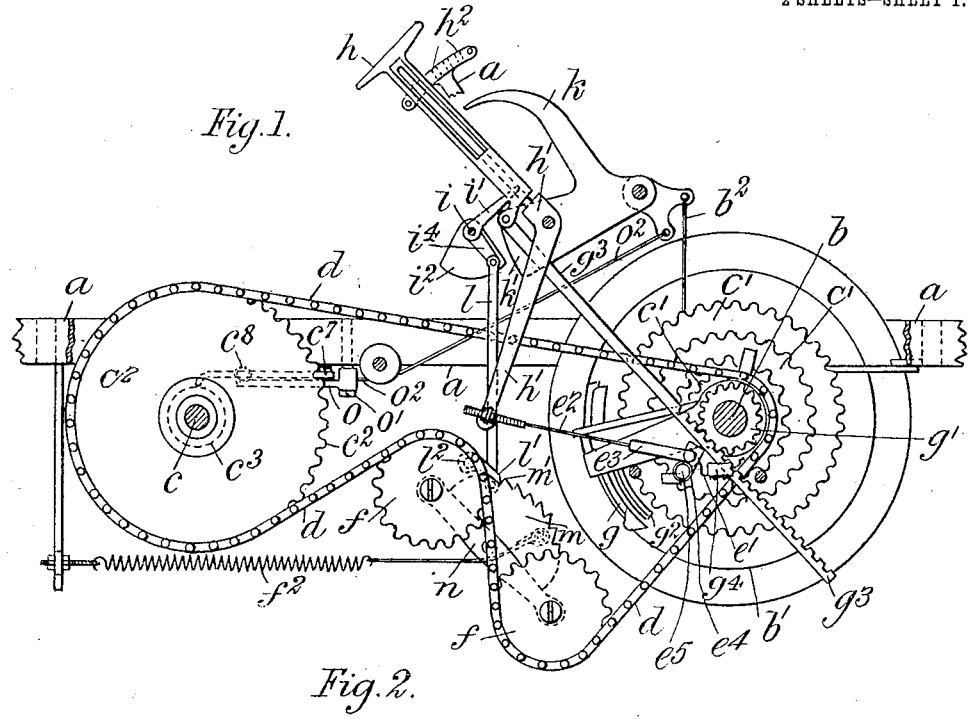

No. 882,635. PATENTED MAR. 24, 1908.
E. H. HODGKINSON.
BELT, ROPE, OR CHAIN GEARING.
APPLICATION FILED JULY 8, 1907.

2 SHEETS—SHEET 1.

Witnesses
M. Lilian Adams.
C. F. Early.

Inventor
Edmund Hugh Hodgkinson,
By his Attorneys,
Baldwin & Wight.

No. 882,635. PATENTED MAR. 24, 1908.
E. H. HODGKINSON.
BELT, ROPE, OR CHAIN GEARING.
APPLICATION FILED JULY 8, 1907.
2 SHEETS—SHEET 2.
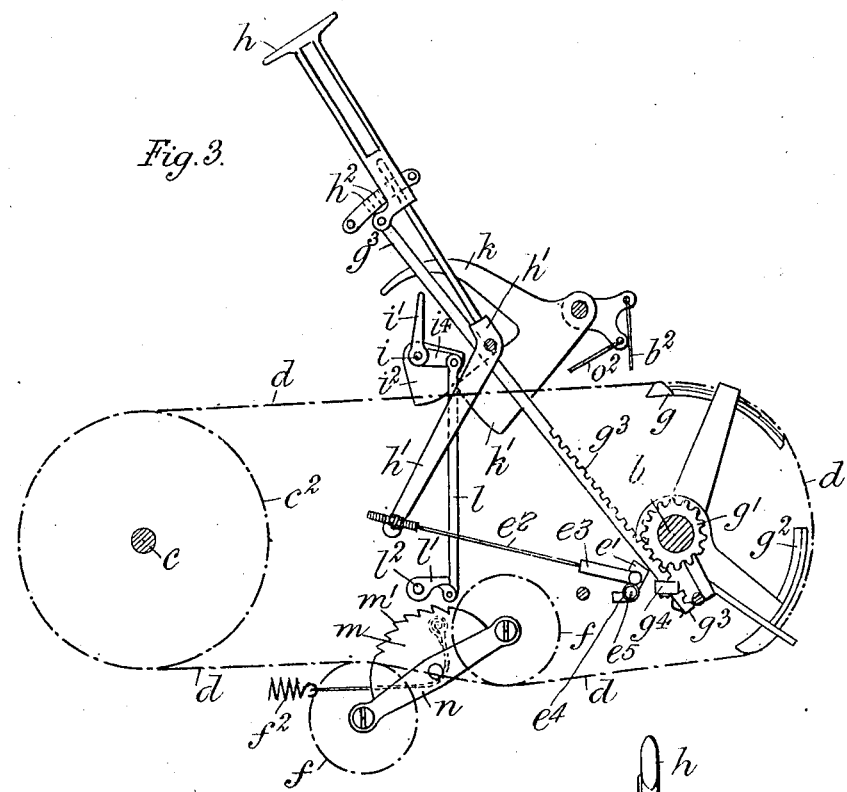
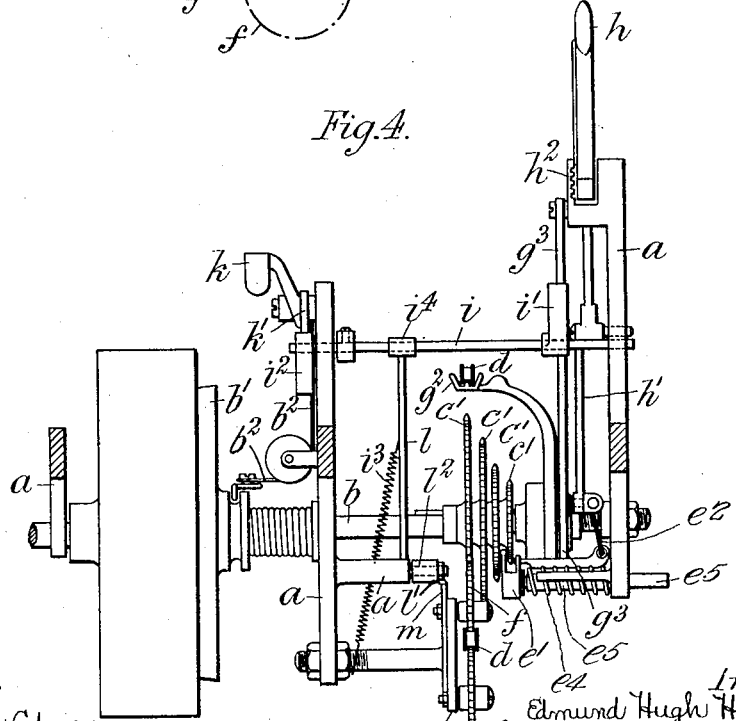
Witnesses
M. Lilian Adams.
C. F. Early.
Inventor
Edmund Hugh Hodgkinson
By his Attorneys,
Baldwin & Wight

UNITED STATES PATENT OFFICE.

EDMUND HUGH HODGKINSON, OF LONDON, ENGLAND.

BELT, ROPE, OR CHAIN GEARING.

No. 882,635.  Specification of Letters Patent.  Patented March 24, 1908.

Application filed July 8, 1907. Serial No. 382,712.

*To all whom it may concern:*

Be it known that I, EDMUND HUGH HODGKINSON, gentleman, a subject of the King of Great Britain, residing at 8 Lancaster Gate, Hyde Park, London, England, have invented new and useful Improvements in and Relating to Belt, Rope, or Chain Gearing, of which the following is a specification.

This invention applies to change speed driving gear where the driving of a shaft is effected by an endless chain encircling a toothed wheel and pinion, and relates to the invention described in my former patents Nos. 617572, 619572 and 702948.

The driving chain is shifted from one pinion to another by the aid of a chain lifter. Such chain lifter has preferably two (or more) limbs placed inside the frame of the machine. Each limb of the chain lifter makes a partial rotation around the axis of the pinions.

This invention enables the chain lifter to be opened or put in action more easily at any time, even when the car is stationary, provided that the primary or engine clutch and the clutch on the driven shaft are unclutched, or thrown out of gear. It also by means of an automatic locking arrangement, prevents derangement or damage to the chain lifters so that they cannot be inadvertently put in action until the engine clutch is unclutched. The chain lifters can thus now safely open either towards the driving portion of the chain or towards the slack portion. I now prefer to make them open towards the normal driving portion of the chain.

This invention also enables a lighter spring to be employed for actuating the swing arm or pivoted lever, on which the jockey wheels are mounted. Also there is no necessity for employing jockey wheels working alternately, not only on the normal clack portion of the chain but also on the normal driving portion of the chain because I now employ a pawl, or similar suitable locking device, which fixes or locks the pivoted lever on which the jockey wheels are mounted. By means of this pawl, when locked, the normal driving portion of the chain can only become slightly slack if the car, or the driven shaft, over-runs the engine. This pawl also tends to prevent the chain mounting the teeth of the pinions, and enables the car when running to start the engine, and also allows the engine to be used as a brake.

The chain lifters may be applied to the engine shaft or to a countershaft or to both. I preferably apply the chain lifters to the driving pinions which are keyed to that portion of the engine shaft which is capable of being unclutched.

The drawings illustrate mechanism made in accordance with my invention.

Figure 2:
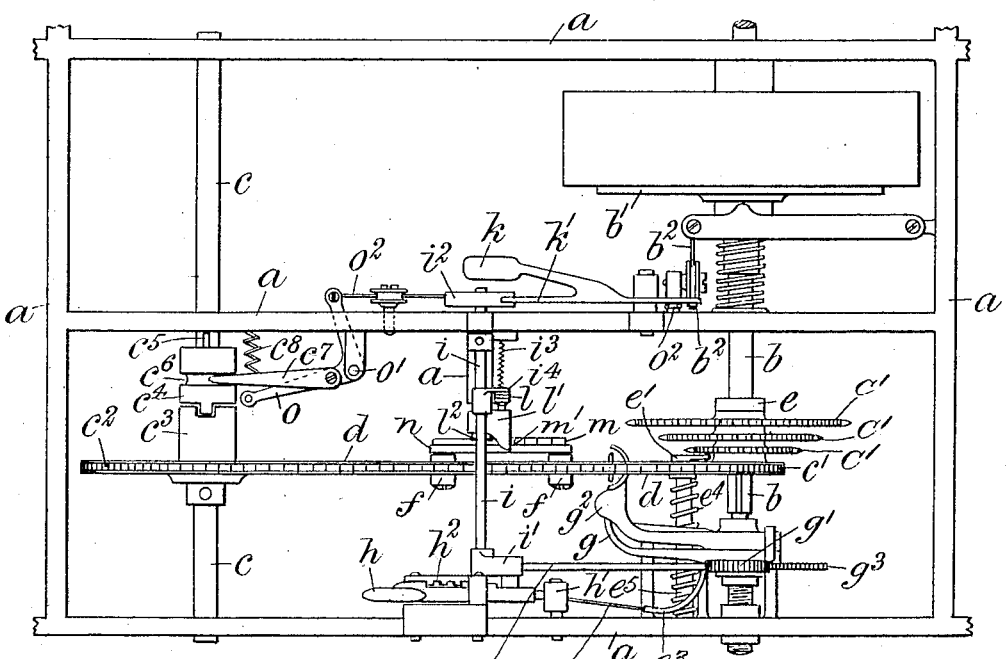

Figure 1 is a side elevation with part of the frame removed and Fig. 2 is a plan. Fig. 3 is a similar view to Fig. 1 the chain lifters being open instead of shut. Fig. 4 is a rear view with a portion of the frame removed.

$a$ is the frame carrying the pinion shaft $b$ and the driven shaft $c$.

$d$ is the chain normally passing round one of the pinions $c'$ on the pinion block $e$ the pinion $c^2$ on the shaft $c$ and the jockey wheels $f\ f$.

For actuating the chain lifters $g$ which are free to turn on or concentrically with the shaft $b$ I attach a spur wheel $g'$ to the boss of the leading limb $g^2$, the spur wheel $g'$ engaging with a rack $g^3$ one end of which is pivoted to the slider $h$ of the speed lever $h'$ and the other end slides in the guide $g^4$. When the slider $h$ is pulled up it thus opens the leading limb $g^2$ and when the slider is pushed down it closes the leading limb. The slider $h$ works on the speed lever $h'$ and can be placed in any of the catches $h^2$ thus causing the speed lever to place one of the driving pinions on the pinion block $e$ in line with the chain as hitherto.

The pinion block $e$ is operated by the slotted head $e'$ of a rod $e^5$ adapted to slide in suitable bearings in the frame in a direction parallel with the axis of the shaft $b$. The head $e'$ is normally pressed outwards by a spring $e^4$ on the rod $e^5$ interposed between a portion of the frame $a$ and the head $e'$. The smallest pinion $c'$ is engaged by the slotted head. The head $e'$ is connected with the speed lever $h'$ by a flexible connection $e^2$ which passes through a guide tube $e^3$. As the speed lever $h'$ is rocked, the pinion block with the pinions thereon is moved back and forth on the shaft $b$ so as to bring either of the pinions $c'$ in line with the drive chain $d$. The speed lever may be locked by the toothed segment $h^2$, as before explained and in an obvious manner.

In order to prevent the leading limb $g^2$ of the chain lifter being put in action before the engine has been unclutched I employ a rocking spindle $i$ having fixed to it an arm $i'$ which engages with the top of the rack $g^3$ when the slider $h$ is down, the chain lifters being now closed. The other end of the spindle $i$ has a cam $i^2$ of circular shape fixed to it in such a position that it is just clear of a similar suitably shaped portion $R'$ of the clutch pedal R, these parts rendering it impossible for the slider $h$ to be pulled up until the clutch pedal is moved to its full extent, so that the engine clutch $b'$ is unclutched or uncoupled, and also the clutch $c^3$ upon the driven shaft $c$.

If the slider $h$ be raised the rack $g^3$ attached to it raises the arm $i'$ and turns the rocking spindle $i$ which turns the cam $i^2$ so that the clutch pedal R cannot be raised and thus the engine clutch cannot be clutched. The arm $i'$ remains raised until the slider $h$ is again pushed down, and the arm $i'$ is simultaneously returned to its original position by means of a spring $i^3$. The rocking spindle $i$ has fixed to it a lever $i^4$ which is pivotally connected to one end of a connecting rod $l$, to which is pivoted a pawl $l'$ free to turn on a pin $l^2$ on the frame $a$. The pawl $l'$ engages with teeth $m'$ on a ratchet $m$ fixed to the pivoted lever $n$ on which are mounted the two jockey wheels $ff$ for taking up the slack of the chain. Thus when the slider $h$ is drawn up it disengages the pawl $l'$ and allows the jockey wheels to take up the slack of the chain.

When the slider $h$ is pushed down to its normal position the pawl $l'$ is also pressed down into one of the teeth $m'$. When the pawl $l'$ is engaged it retains the jockey wheels $ff$ in position, so that if the car overruns the engine, then as soon as the jockey wheel spring $f^2$ actuating the lever $n$ has been overcome, that spring cannot be further distended as the pawl $l'$ takes the strain and the position of the jockey wheels is now fixed, there being only a slight amount of slack in what is the normal driving portion of the chain. Any necessity for jockey wheels working on the normal driving portion of the chain is thus obviated. If the motor or engine is capable of reversing, no further reversing gear is required.

The toothed wheel $c^2$ driven by the chain $d$ is fixed on a sleeve $c^3$ which is free to revolve in either direction upon the driven shaft $c$. The sleeve $c^3$ forms part of a clutch preferably a dog clutch. The other part $c^4$ of the clutch is free to slide along the shaft $c$ but is secured to it by the key $c^5$.

This part of the clutch engages by means of an annular groove $c^6$ with a finger $c^7$ actuated by a spring $c^8$. The finger is pivoted to a lever $o$ whose fulcrum $o'$ is on the frame. When this lever is moved away it presses against the finger $c^7$ and thus withdraws the sliding half $c^4$ of this clutch. This clutch I term the secondary clutch. When the lever $o$ is moved towards the unkeyed portion $c^3$ of the clutch, the spring $c^8$ actuates the finger $c^7$ and presses the sliding portion $c^4$ so that it tends to engage with the other portion $c^3$ of the clutch. Thus the pivoted lever actuates this secondary clutch. This pivoted lever $o$ is connected by a connection $o^2$ to the clutch pedal $k$ which actuates the main clutch $b'$ on the engine shaft through a connection $b^2$. The clutch pedal $k$ thus unclutches both the engine clutch $b'$ and the secondary clutch on the driven shaft $c$ and both clutches are thus unclutched before the slider $h$ on the speed lever $h'$ can be raised.

When in this specification I refer to driving chains, chain lifters, chain pinions and so forth I intend to include driving belts and ropes and lifters and pulleys adapted to work with belts and ropes.

What I claim is:—

1. The combination of a driving shaft, an engine clutch thereon, a driven shaft, a secondary clutch thereon, a chain geared with the shafts, a chain lifter, and means for actuating the chain lifter interlocked with the clutches.

2. The combination of a driving shaft, an engine clutch thereon, a driven shaft, a secondary clutch thereon, a chain geared with said shafts, a chain lifter, jockey wheels engaging with the chain, and means for locking the jockey wheels when the chain is in its working position.

3. The combination of a driving shaft, an engine clutch thereon, a driven shaft, a secondary clutch thereon, a chain gearing with the shafts, a chain lifter, means for actuating said chain lifter interlocked with the clutches, jockey wheels engaging with the chain, and means for locking the jockey wheels when the chain is in its working position.

EDMUND HUGH HODGKINSON.

Witnesses:
W. PERCY CARPMAEL,
R. B. RANSFORD.